S. J. LASK.
ADJUSTABLE PARALLEL.
APPLICATION FILED FEB. 17, 1919.

1,335,247.

Patented Mar. 30, 1920.

Inventor,
S. J. LASK.
By John A. Bornhardt
Atty.

UNITED STATES PATENT OFFICE.

STEPHAN J. LASK, OF CLEVELAND, OHIO.

ADJUSTABLE PARALLEL.

1,335,247.　　　Specification of Letters Patent.　　Patented Mar. 30, 1920.

Application filed February 17, 1919. Serial No. 277,548.

*To all whom it may concern:*

Be it known that I, STEPHAN J. LASK, a subject of the Government of Austria-Hungary, residing at Cleveland, in the county of Cuyahoga and State of Ohio, have invented certain new and useful Improvements in Adjustable Parallels, of which the following is a specification.

This invention relates to devices for supporting and adjusting work on machine tools, and is particularly useful in connection with milling, planing and shaping machines, and it has for its object to provide an improved device which serves as a chuck in support for the work held in vises used in connection with such machines, and for supporting the work in a parallel position with respect to the bed, at various elevations to which the device may be adjusted. Means are provided for locking the attachment after it is adjusted to the desired level, and the adjustment is effected without varying the parallel relation of the work with respect to the bed of the machine.

This invention is illustrated in the accompanying drawings, in which—

Figure 1:
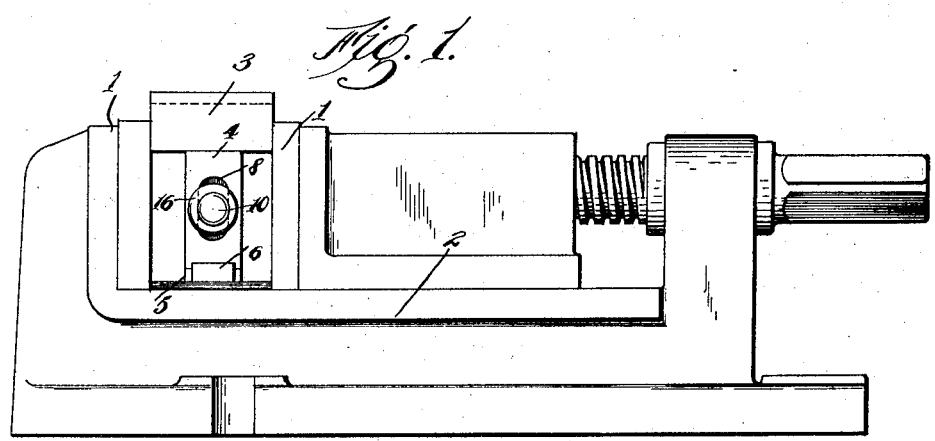
Figure 1 is a side elevation of a milling machine vise with the device applied thereto.

Referring specifically to the drawings, 1 indicates the jaws of a machine vise, 2 the base thereof and 3 the work held between the jaws. The device invented by me supports and levels the work, and comprises upper and lower triangular or wedge blocks 4 and 5 which are placed one upon the other with their inclined faces in contact. The face of the lower block 5 has a dove-tailed rib 6 which is slidably engaged in a corresponding groove 7 in the inclined face of the upper block. This permits the blocks to slide upon each other to vary the vertical dimensions of the attachment, but locks the parts against other movement or separation. The upper block 4 has a longitudinal slot 8 through the same, of sufficient height to allow for the desired adjustment. A screw 9 extends through this slot and is tapped into a threaded bore 15, in the lower block 5. The screw is turned by handle 10, and has a flange 16 thereon which abuts against the side of the block 4, to advance the same along the inclined surface of the block 5.

Figure 4:
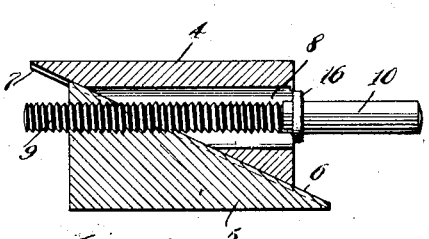
Fig. 4 is a section of a modification.
Figure 3:
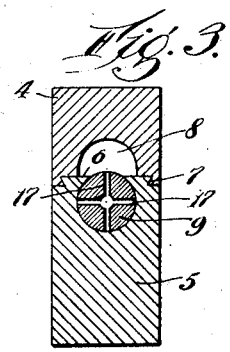
Fig. 3 is a cross section on the line 3—3 of Fig. 2.

It is obvious that by manipulating the screw the height of the device may be varied, to support the work at the desired elevation, this simple adjustment being applicable to the simple form shown in Fig. 4.

Figure 2:
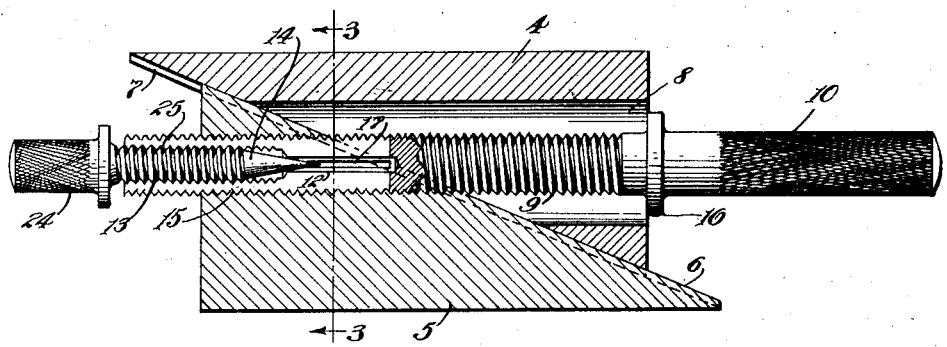
Fig. 2 is a central longitudinal section through the adjusting block or device.

To lock the block at adjustment, the screw 9 is split for a considerable portion of its length, at its inner end, as indicated at 17, two splits being shown, at a right angle to each other. Its inner end is also counterbored and threaded, as shown at 25, and this counter-bore terminates in a reduced central bore 12. A screw 13 fits in the counter-bore, and may be turned by a handle 24. At its inner end this screw terminates in a conical point 14 which projects into the bore 12. To lock the main screw 9, the screw 13 is advanced and the conical point 14 acts to spread the segments of the screw 9, thereby locking the same against the threaded bore 15, and preventing any movement of the screw 9 until the screw 13 is backed out to relieve the expansion. By the means described the block may be adjusted to support the work at the desired elevation while preserving the parallelism of the work to the machine bed, and by the means shown in Fig. 2, the supporting block may be locked at adjustment.

The device will be found very useful in connection with the work supports or holders of milling machines and other machine tools generally.

I claim:

1. An attachment for work holders, comprising a pair of wedge blocks slidable upon each other, one block having a slot extending lengthwise through the same and the other having a threaded bore in line with the slot, and a screw extending through the slot and into the bore, to adjust the blocks with respect to each other.

2. A device comprising a pair of wedge blocks slidable upon each other, an adjusting screw extending lengthwise through the blocks, and means exposed at the inner end of the screw to lock the same at adjustment.

3. A device comprising a pair of blocks having inclined faces in contact, one block being slotted lengthwise and the other having a threaded bore in line with the slot, an adjusting screw extending through the slot and into the bore, the inner end of the screw being split and counter-bored, and a locking screw engaged in said counter-bore and having a tapered part engageable with said split portion to expand the same into locking engagements with the block.

In testimony whereof, I do affix my signature in the presence of two witnesses.

STEPHAN J. LASK.

Witnesses:
ALBERT FLOCK,
JOHN A. BOMMHARDT.